(12) United States Patent
Lee et al.

(10) Patent No.: US 12,525,402 B2
(45) Date of Patent: Jan. 13, 2026

(54) MULTILAYER ELECTRONIC COMPONENT

(71) Applicant: SAMSUNG ELECTRO-MECHANICS CO., LTD., Suwon-si (KR)

(72) Inventors: Yoo Jeong Lee, Suwon-si (KR); Hyung Jong Choi, Suwon-si (KR); Chung Yeol Lee, Suwon-si (KR); Kwang Yeun Won, Suwon-si (KR); So Jung An, Suwon-si (KR); Woo Kyung Sung, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 126 days.

(21) Appl. No.: 18/087,435

(22) Filed: Dec. 22, 2022

(65) Prior Publication Data
US 2023/0260709 A1      Aug. 17, 2023

(30) Foreign Application Priority Data

Feb. 16, 2022   (KR) .......................... 10-2022-0020315

(51) Int. Cl.
*H01G 4/30*      (2006.01)
*H01G 4/008*    (2006.01)
(Continued)

(52) U.S. Cl.
CPC ............... *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC ............ H01G 4/30; H01G 4/012; H01G 4/12; H01G 4/232; H01G 4/2325; H01G 4/228;
(Continued)

(56) References Cited

U.S. PATENT DOCUMENTS 10,446,320 B2 *  10/2019  Kim ........................ H01G 4/30
2014/0347783 A1 *  11/2014  Kisumi ................ H01G 4/2325
                                                                 427/79
(Continued)

FOREIGN PATENT DOCUMENTS

JP          2019-220602 A     12/2019
KR   10-2018-0084030 A       7/2018
(Continued)

OTHER PUBLICATIONS

Korean Notice of Reasons for Rejection dated Nov. 5, 2025 issued in Korean Patent Application No. 10-2022-0020315 (with English translation).

*Primary Examiner* — Arun Ramaswamy
(74) *Attorney, Agent, or Firm* — Morgan Lewis & Bockius LLP

(57) ABSTRACT

A multilayer electronic component includes a body including a plurality of internal electrodes and a dielectric layer interposed between the plurality of internal electrodes, and an external electrode including an electrode layer disposed on the body to be connected to the plurality of internal electrodes and a conductive resin layer disposed on the electrode layer. The electrode layer includes an island region.

22 Claims, 3 Drawing Sheets

(51) Int. Cl.
*H01G 4/012* (2006.01)
*H01G 4/12* (2006.01)
*H01G 4/232* (2006.01)

(58) Field of Classification Search
CPC ........ H01G 4/248; H01G 4/008; H10G 4/008; H10G 4/2325; H10G 4/30
USPC ..................... 361/301.4, 321.1, 321.3, 306.3
See application file for complete search history.

(56) References Cited

U.S. PATENT DOCUMENTS

| | | | |
|---|---|---|---|
| 2015/0136463 A1* | 5/2015 | Lee | H01G 4/232 |
| | | | 361/301.4 |
| 2018/0151296 A1* | 5/2018 | Yamada | H01G 2/065 |
| 2018/0166215 A1* | 6/2018 | Hamanaka | H01G 4/12 |
| 2019/0131076 A1* | 5/2019 | Fukumura | H01G 4/232 |
| 2019/0295773 A1* | 9/2019 | Kim | H01G 4/30 |
| 2019/0392991 A1 | 12/2019 | Harada | |
| 2020/0135403 A1* | 4/2020 | Lee | H01G 4/12 |
| 2020/0176189 A1 | 6/2020 | Koo et al. | |
| 2020/0402718 A1* | 12/2020 | Oosawa | H01G 4/2325 |
| 2021/0012964 A1* | 1/2021 | Lee | H01G 4/232 |
| 2021/0057153 A1 | 2/2021 | Jun et al. | |
| 2021/0074481 A1 | 3/2021 | Yi et al. | |

FOREIGN PATENT DOCUMENTS

| | | |
|---|---|---|
| KR | 10-2019-0116158 A | 10/2019 |
| KR | 10-2019-0116168 A | 10/2019 |
| KR | 10-2020-0064860 A | 6/2020 |

* cited by examiner

MULTILAYER ELECTRONIC COMPONENT

CROSS-REFERENCE TO RELATED APPLICATION(S)

This application claims benefit of priority to Korean Patent Application No. 10-2022-0020315 filed on Feb. 16, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser commonly mounted on the printed circuit boards of various electronic products, such as image display devices including a liquid crystal display (LCD) and a plasma display panel (PDP), computers, smartphones, mobile phones, and the like, serving to charge and discharge electricity therein and therefrom.

The MLCC may be used as a component of various electronic products due to a small size, high capacitance, and ease of mountability thereof. As components of electronic devices have recently been miniaturized, demands for miniaturization and high capacitance of multilayer ceramic capacitors have been increasing.

With this trend, the size of a multilayer ceramic capacitor is gradually decreasing, and the effective volume ratio of a dielectric in the same volume is increased in order to implement high capacitance on a small scale. Thus, the thickness of an electrode is relatively getting thinner.

However, bending cracks may occur in a multilayer ceramic capacitor due to deformation of a substrate or vibrations. In this case, in the multilayer ceramic capacitor, a product in which a metal external electrode is implemented on a surface of a multilayer body may have cracks in the surface thereof, and these cracks may cause a decrease in insulation resistance caused by moisture or a decrease in reliability such as a short circuit of an internal electrode.

SUMMARY

An aspect of the present disclosure is provide a multilayer electronic component having improved bending strength.

Another aspect of the present disclosure provides a multilayer electronic component capable of preventing occurrence of bending cracks caused by a change of a substrate or the like by reducing thermal and mechanical stress caused by an external environment.

However, the aspects of the present disclosure are not limited to the above description, and will be more easily understood in the course of describing specific example embodiments of the present disclosure.

According to an aspect of the present disclosure, provided is a multilayer electronic component, the multilayer electronic component including a body having a plurality of internal electrodes and a dielectric layer interposed between the plurality of internal electrodes, and an external electrode including an electrode layer disposed on the body to be connected to the plurality of internal electrodes and a conductive resin layer disposed on the electrode layer. The electrode layer may include an island region.

According to example embodiments of the present disclosure, a multilayer electronic component may have improved bending strength.

In addition, according to example embodiments of the present disclosure, the multilayer electronic component may prevent the occurrence of bending cracks caused by a change of a substrate or the like by reducing thermal and mechanical stress caused by an external environment.

However, various and beneficial advantages and effects of the present disclosure are not limited to the above description, and will be more easily understood in the course of describing specific example embodiments of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
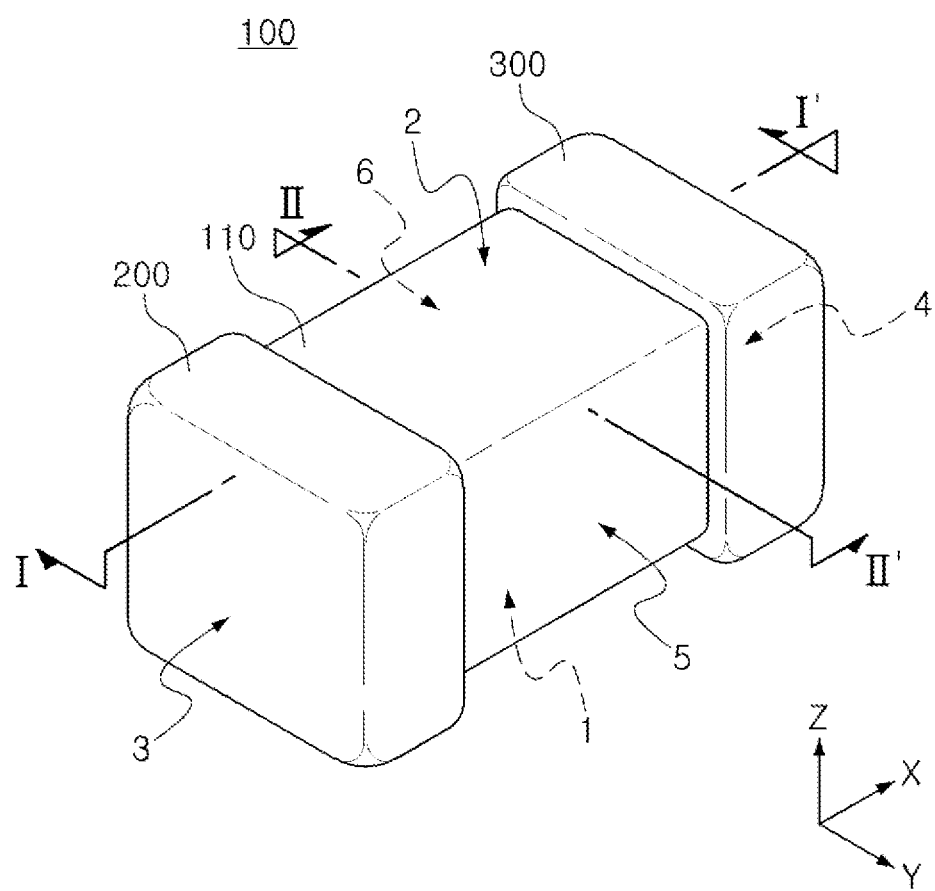
FIG. 1 is a perspective view schematically illustrating a multilayer electronic component according to an example embodiment of the present disclosure.

Hereinafter, example embodiments of the present disclosure will be described as follows with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, an X-direction may be understood as a first direction or a longitudinal direction, a Y-direction may be understood as a second direction or a width direction, and a Z-direction may be understood as a third direction, a thickness direction, or a stacking direction, but the present disclosure is not limited thereto.

Multilayer Electronic Component

FIG. 1 is a perspective view schematically illustrating a multilayer electronic component according to an example embodiment of the present disclosure.

Figure 2:
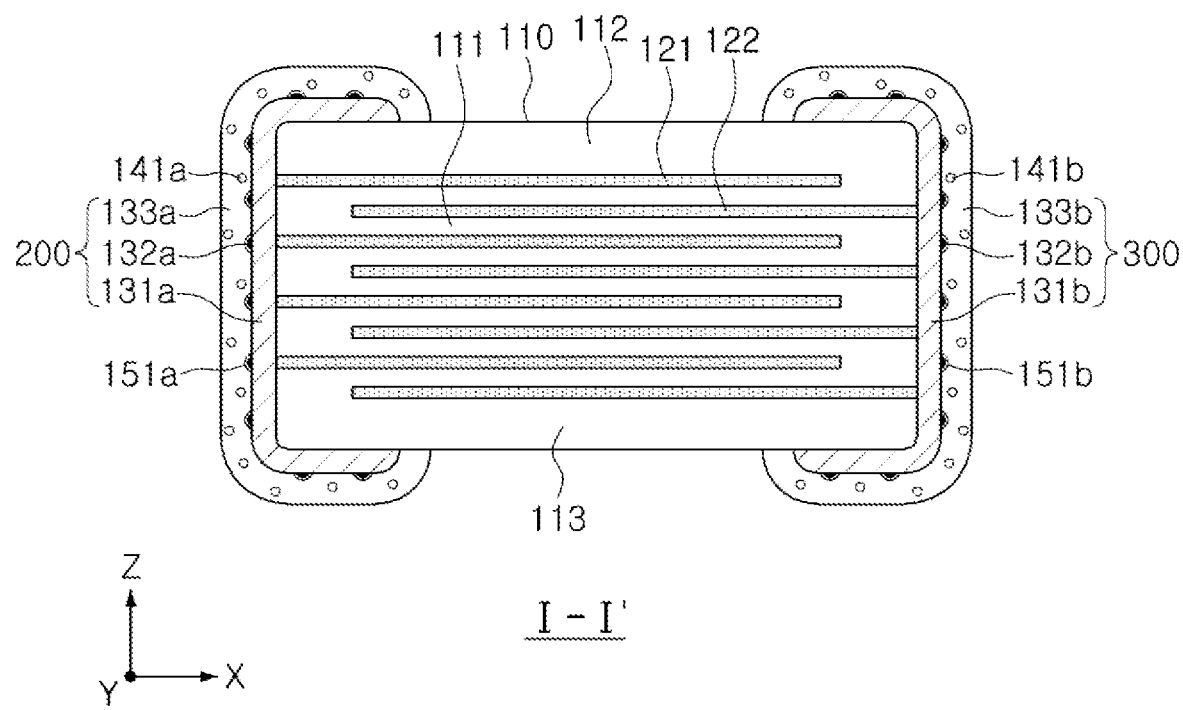
FIG. 2 schematically illustrates a cross-sectional view taken along line I-I' of FIG. 1.

FIG. 2 schematically illustrates a cross-sectional view taken along line I-I' of FIG. 1.

Figure 3:
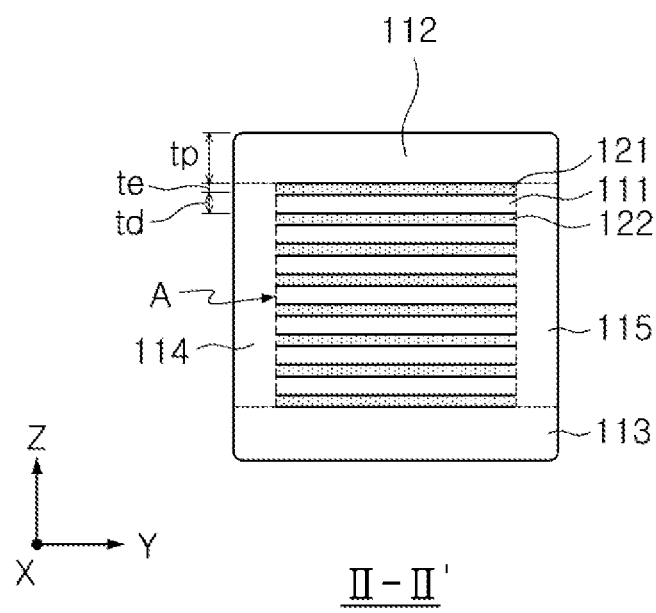
FIG. 3 schematically illustrates a cross-sectional view taken along line II-II' of FIG. 1.

FIG. 3 schematically illustrates a cross-sectional view taken along line II-II' of FIG. 1.

Figure 4:
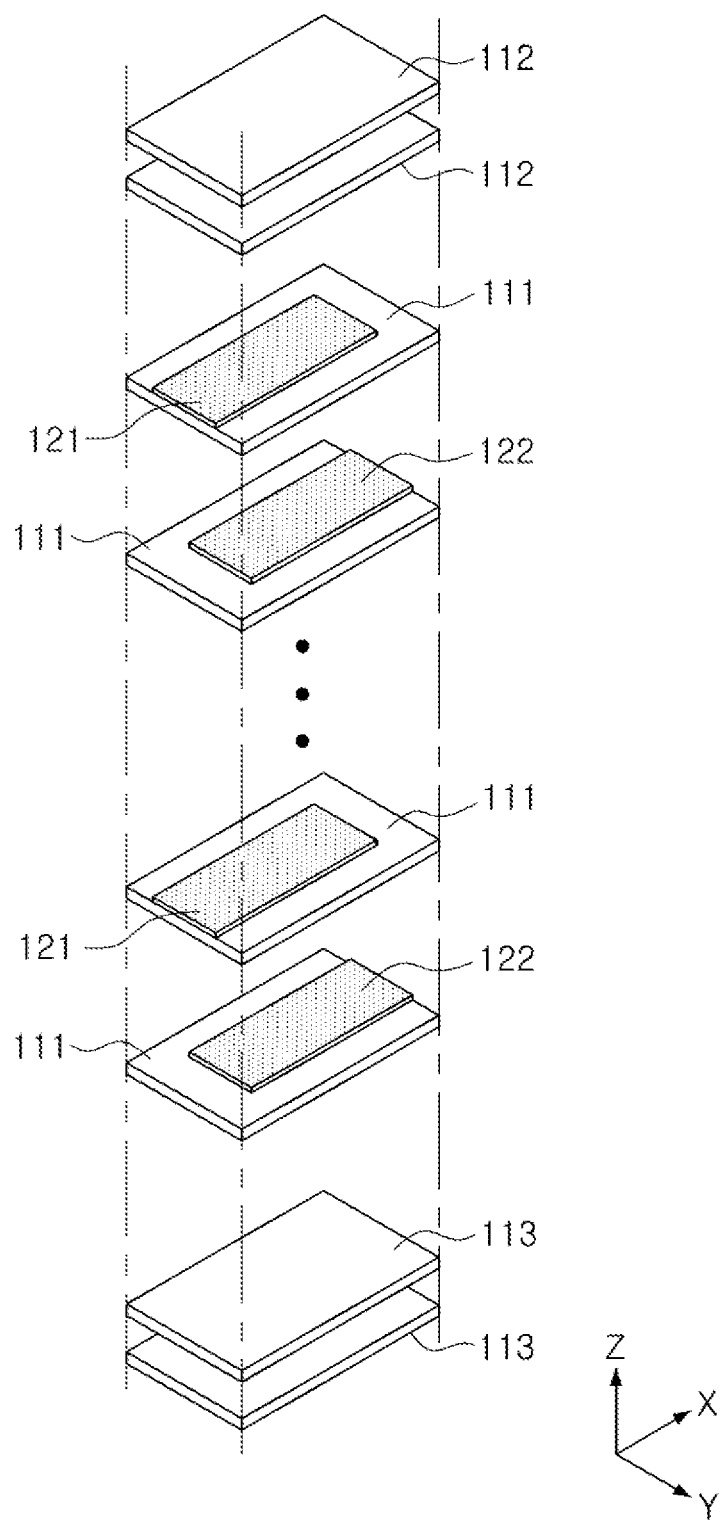
FIG. 4 is an exploded perspective view schematically illustrating a body in which a dielectric layer and an internal electrode are stacked so as to manufacture a multilayer electronic component according to an example embodiment of the present disclosure.

FIG. 4 is an exploded perspective view schematically illustrating a body in which a dielectric layer and an internal electrode are stacked according to an example embodiment of the present disclosure.

Hereinafter, a multilayer electronic component according to an example embodiment of the present disclosure will be described in detail with reference to FIGS. 1 to 4.

A multilayer electronic component 100 according to an example embodiment of the present disclosure may include a body 110 including a plurality of internal electrodes 121 and 122 and a dielectric layer 111 interposed between the plurality of internal electrodes 121 and 122, and electrode layers 132a and 132b disposed on the body 110 to be connected to the plurality of internal electrodes 121 and 122, and conductive resin layers 133a and 133b disposed on the electrode layers 132a and 132b.

The body 110 may include the plurality of internal electrodes 121 and 122 and the dielectric layer 111 interposed between the plurality of internal electrodes 121 and 122. In the body 110, the dielectric layer 111 and the internal electrodes 121 and 122 may be alternately stacked.

A specific shape of the body 110 is not particularly limited, but as illustrated, the body 110 may have a hexahedral shape or a shape similar thereto. Due to shrinkage of ceramic powder included in the body 110 during a sintering process, the body 110 may not have a hexahedral shape with entirely straight lines, but may have a substantially hexahedral shape.

The body 110 may include first and second surfaces 1 and 2 opposing each other in a thickness direction (Z-direction), third and fourth surfaces 3 and 4 connected to the first and second surfaces 1 and 2 and opposing each other in a longitudinal direction (X-direction), and fifth and sixth surfaces 5 and 6 connected to the third and fourth surfaces 3 and 4 and opposing each other in a width direction (Y-direction).

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an example embodiment of the present disclosure, a raw material for forming the dielectric layer 111 is not particularly limited as long as sufficient capacitance is obtainable. For example, a barium titanate-based material, a lead composite perovskite-based material, a strontium titanate-based material, or the like may be used. The barium titanate-based material may include $BaTiO_3$-based ceramic powder. The ceramic powder may include, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which calcium (Ca), zirconium (Zr), and the like are partially dissolved.

As a material for forming the dielectric layer 111, various ceramic additives, organic solvents, binders, dispersants, and the like may be added to powder such as barium titanate ($BaTiO_3$) according to the purpose of the present disclosure.

The internal electrodes 121 and 122 may be disposed alternately with the dielectric layer 111 in a thickness direction (Z-direction). The internal electrodes 121 and 122 may include a first internal electrode 121 and a second internal electrode 122. The first and second internal electrodes 121 and 122 may be alternately disposed to oppose each other with the dielectric layer 111 included the body 110 interposed therebetween, and may be exposed to the third and fourth surfaces 3 and 4 of the body 110, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4.

That is, the first and second internal electrodes 121 and 122 may be alternately exposed to the third surface 3 and the fourth surface 4 that are opposing cross-sections in a longitudinal direction (X-direction) of a body to be respectively exposed to first and second external electrodes 200 and 300. The first internal electrode 121 may not connected to the second external electrode 300, but may be connected to the first external electrode 200. In addition, the second internal electrode 122 may not connected to the first external electrode 200 but may be connected to the second external electrode 300. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically isolated from each other by the dielectric layer 111 disposed therebetween.

A material for forming the first and second internal electrodes 121 and 122 is not particularly limited, and the first and second internal electrodes 121 and 122 may be formed using, for example, a conductive paste formed of at least one material of a noble metal material such as palladium (Pd) or a palladium-silver (Pd—Ag) alloy, nickel (Ni), and copper (Cu).

A method for printing the conductive paste may use a screen printing method, a gravure printing method, or the like, but the present disclosure is not limited thereto.

Referring to FIG. 4, the body 110 may be formed by alternately stacking a ceramic green sheet on which the first internal electrode 121 is printed and a ceramic green sheet on which the second internal electrode 122 is printed, and then sintering the ceramic green sheets.

An average thickness te of the internal electrodes 121 and 122 does need to be particularly limited. However, in order to more easily achieve miniaturization and implementation of high capacitance of a multilayer electronic component, the average thickness te of the internal electrodes 121 and 122 may be within the range of 100 nm to 1.5 μm.

A method for measuring the average thickness te of the internal electrodes 121 and 122 described above is not particularly limited. However, for example, the average thickness te of the internal electrodes 121 and 122 may be measured by scanning, with an SEM, an image of a cross-section of the body 110 in a length and thickness direction (L-T).

For example, with respect to arbitrary first and second internal electrodes 121 and 122 extracted from an image obtained by scanning, with the SEM, a cross-section in a X and Z-direction (length and thickness direction) cut from a central portion in a Y-direction (width direction) of the body 110, a thickness thereof may be measured at thirty equally spaced apart points in a longitudinal direction, thereby measuring an average value thereof.

The body 110 may include a capacitance formation portion A in which a capacitance is formed by including a first internal electrode 121 and a second internal electrode 122 disposed in the body 110 and disposed to oppose each other with a dielectric layer 111 interposed therebetween, and cover portions 112 and 113 formed on upper and lower portions of the capacitance formation portion A.

In addition, the capacitance formation portion A, a portion contributing to capacitance formation of a capacitor, may be formed by repeatedly stacking a plurality of first and second internal electrodes 121 and 122 with the dielectric layer 111 interposed therebetween.

The upper cover portion 112 and the lower cover portion 113 may be formed by respectively stacking a single dielectric layer or two or more dielectric layers on upper and lower surfaces of the capacitance formation portion A in a thickness direction, and may basically serve to prevent damage to an internal electrode caused by physical or chemical stress.

The upper cover portion 112 and the lower cover portion 113 may not include an internal electrode, and may include the same material as that of the dielectric layer 111.

That is, the upper cover portion 112 and the lower cover portion 113 may include a ceramic material, for example, a barium titanate ($BaTiO_3$)-based ceramic material.

A thickness of each of the cover portions 112 and 113 does not need to be particularly limited. However, in order to more easily achieve miniaturization and implementation of high capacitance of a multilayer electronic component, a thickness tp of each of the cover portions 112 and 113 may be 20 μm or less.

In addition, margin portions 114 and 115 may be disposed on side surfaces of the capacitance formation portion A, respectively.

The margin portions 114 and 115 may include the margin portion 114 disposed on the sixth surface 6 of the body 110 and the margin portion 115 disposed on the fifth surface 5 of the body 110. That is, the margin portions 114 and 115 may be disposed on opposite side surfaces of the ceramic body 110 in a width direction (Y-direction).

As illustrated in FIG. 3, the margin portions 114 and 115 may refer to regions between opposite ends of the first and second internal electrodes 121 and 122 and boundaries of the body 110 in a cross-section of the body 110 cut in a width-thickness (W-T) direction.

The margins portions 114 and 115 may basically serve to prevent damage to an internal electrode caused by physical or chemical stress.

The margin portions 114 and 115 may be formed by coating a conductive paste on a ceramic green sheet except a portion where a margin portion is to be formed so as to form an internal electrode.

Alternatively, in order to suppress a step difference caused by the internal electrodes 121 and 122, the internal electrodes 121 and 122 may be cut to be exposed to the fifth and sixth surfaces 5 and 6 of the body 110 after being stacked, and then a single dielectric layer or two or more dielectric layers may be stacked on opposite side surfaces of the capacitance formation portion A in a width direction, thereby forming the margin portions 114 and 115.

The external electrodes 200 and 300 may be disposed on the body 110, and may be connected to the internal electrodes 121 and 122.

As illustrated in FIG. 2, the external electrodes 200 and 300 respectively disposed on the third and fourth surfaces 3 and 4 of the body 110 and respectively connected to the first and second internal electrodes 121 and 122 may be included.

In the present embodiment, a structure in which the multilayer electronic component 100 has two external electrodes 200 and 300 is described, but the number or shapes of the external electrodes 200 and 300 may be changed according to shapes of the internal electrodes 121 and 122 or other purposes.

In the multilayer electronic component 100 according to the present disclosure, the external electrodes 200 and 300 may include, as illustrated in FIG. 2, the electrode layers 132a and 132b disposed on the body 110 to be connected to the plurality of internal electrodes 121 and 122, and the conductive resin layers 133a and 133b disposed on the electrode layers 132a and 132b.

In general, in order to improve bending strength, an external electrode of a multilayer electronic component may be formed using a resin including conductive metal particles, thereby reducing thermal and mechanical stress caused by an external environment using ductility of the resin, and preventing bending cracks caused by a change of a substrate or the like.

However, in the case of the resin used for the external electrode, there is a concern that moisture-resistance reliability may be generally weak due to high moisture permeability. In order to prevent this, in the related art, an external electrode having a structure has been developed in which a nickel (Ni) external electrode is disposed as an external electrode on an internal electrode of a body, and a nickel (Ni)-tin (Sn) alloy layer and a conductive resin layer including tin (Sn) metal particles are sequentially present on the nickel external electrode.

However, in the related art, in order to secure electrical connectivity in the external electrode, tin (Sn) included in the conductive resin layer and underlying nickel (Ni) need to form an alloy. In order to form a nickel (Ni)-tin (Sn) alloy, it is necessary to perform high-temperature heat treatment at 400° C. or higher. Such high-temperature heat treatment may cause cracks due to thermal expansion in a body of a multilayer electronic component, and lowers productivity.

Accordingly, the present inventors conducted intensive research to resolve the above-described issues in the related art, and found that it is possible to secure electrical connectivity between the conductive metal particles included in the conductive resin layers 133a and 133b and underlying electrode layers 131a and 131b through a curing treatment at a temperature of 400° C. or less (or less than 400° C.) by configuring the electrode layers 132a and 132b to include an island region.

In other words, the electrode layers 132a and 132b included in the external electrode, as illustrated in FIG. 2, may cover layers (for example, the underlying electrode layers 131a and 131b) provided under the electrode layers 132a and 132b, and cover (or expose) portions of surfaces of the layers provided thereunder.

In this case, according to an example embodiment of the present disclosure, the electrode layers 132a and 132b may include copper (Cu) as a conductive metal. Using copper (Cu) as a conductive metal included in an electrode layer, electrical connectivity with tin (Sn) and epoxy resin may be implemented at a low curing temperature of 400° C. or less. In some embodiments, the conductive resin layer includes epoxy. In addition, copper (Cu) may have a plastic deformation property greater than that of a conductive metal (for example, nickel (Ni)) included in the underlying electrode layers 131a and 131b, and thus thermal and mechanical stress may be reduced.

The above-described electrode layers 132a and 132b may be implemented using various methods such as electrolytic plating, electroless plating, sputtering, and spraying on a material including a conductive metal such as copper (Cu). For example, as illustrated in FIG. 2, in order to form the electrode layers 132a and 132b to include the island region, Cu nanoparticles dispersed in a solvent may be applied through a sol-gel method, a spray coating method, or a dipping method, and then the solvent may be removed to form a copper island layer. In this manner, when the electrode layers 132a and 132b are formed using nanoparticles, a surface area may be increased, and thus a contact area with the conductive resin layers 133a and 133b may be increased. Accordingly, when the nanoparticles are used, surface energy may be high, so that the nanoparticles may react well with a tin metal in the conductive resin layer to form an intermetallic compound, which may be advantageous in improving interfacial adhesion. For example, in a case in which 500 nm Cu nanoparticles are applied (coated), based on a head surface having a size of 1005 (500×500 µm$^2$), and more than 50% of nanoparticles are distributed on the head surface, a bonding surface area may be increased as compared to a case in which a conventional Cu external electrode is applied. In addition, when more than 70% of particles are distributed on the head surface, a surface area that may be in contact with a resin layer may be increased by 40% as compared to a reference (Cu external electrode single layer).

According to an example embodiment of the present disclosure, a ratio of a region in which an electrode layer is formed (or a region on which an electrode layer is disposed) to a surface of a body on which the external electrode is disposed or provided with the external electrode may be 50% or more (or 50% or more and less than 100%, more preferably 50% or more and 70% or less). When the ratio of the region in which the electrode layer is formed to the surface of the body provided with the external electrode is less than 50%, a contact area between a lower Ni electrode and an upper resin electrode may be reduced, resulting in an increase in ESR. Alternatively, when the ratio of the region in which the electrode layer is formed to the surface of the body provided with the external electrode is greater than 70%, a coating operation may need to be repeated several times, so that workability may be lowered, and high-concentration Cu nanoparticle solution having low dispersion stability may be used.

In this case, as one method for measuring the above-described ratio of the region in which the electrode layer is formed to the surface of the body provided with the external electrode, the ratio may be measured by scanning, with an SEM, an image of a cross-section of the body 110 in a length and thickness direction (L-T).

For example, as illustrated in FIG. 2, the ratio may be obtained by measuring a ratio of a length of the region in which the electrode layer is formed to a total length of the surface of the body provided with the external electrode with respect to the external electrodes 200 and 300 extracted from an image obtained by scanning, with the SEM, a cross-section in a X and Z-direction (length and thickness direction) cut from a central portion in a Y-direction (width direction) of the body 110.

In addition, according to an example embodiment of the present disclosure, the underlying electrode layers 131a and 131b may be further included between the body 110 and the electrode layers 132a and 132b. In this case, the underlying electrode layers 131a and 131b may include, for example, nickel (Ni) as a conductive metal.

In this manner, copper (Cu) may be used as a conductive metal included in the electrode layers 132a and 132b, and nickel (Ni) may be used as a conductive metal included in the underlying electrode layers 131a and 131b, thereby preventing occurrence of cracks to improve bending strength, and minimizing occurrence of defects caused by thermal and mechanical stress.

Accordingly, in a case in which the above-described underlying electrode layers 131a and 131b are provided, as illustrated in FIG. 2, the electrode layers 132a and 132b may cover the underlying electrode layers 131a and 131b provided thereunder, and the island region may be provided to cover (or expose) portions of surfaces of the underlying electrode layers 131a and 131b.

According to an example embodiment of the present disclosure, the underlying electrode layers 131a and 131b may be obtained by coating a conductive paste including a conductive metal (for example, Ni) on opposite end surfaces of an un-sintered multilayer body for manufacturing a multilayer electronic component, and then integrally performing sintering thereon.

According to an example embodiment of the present disclosure, in a case in which the above-described underlying electrode layers 131a and 131b are provided, a ratio of a region in which each of the electrode layers 132a and 132b is formed (or a region on which each of the electrode layers 132a and 132b is disposed) to a surface of each of the underlying electrode layers 131a and 131b may be 50% or more (or 50% or more and less than 100%, more preferably 50% or more and 70% or less). When the ratio of the region in which each of the electrode layers 132a and 132b is formed to the surface of each of the underlying electrode layers 131a and 131b is less than 50%, a contact area between lower Ni electrode and an upper resin electrode may be reduced, resulting in an increase in ESR. When the ratio of the region in which each of the electrode layers 132a and 132b is formed to the surface of each of the underlying electrode layers 131a and 131b is greater than 70%, a coating operation may need to be repeated several times, so that workability may be lowered, and high-concentration Cu nanoparticle solution having low dispersion stability may be used.

In this case, as one method for measuring the above-described ratio of the region in which each of the electrode layers 132a and 132b is formed to the surface of each of the underlying electrode layers 131a and 131b, the ratio may be measured by scanning, with an SEM, an image of a cross-section of the body 110 in a length and thickness direction (L-T).

For example, as illustrated in FIG. 2, the ratio may be obtained by measuring a ratio of a length of the region in which each of the electrode layers 132a and 132b is formed to a total length of the surface of each of the underlying electrode layers 131a and 131b with respect to the external electrodes 200 and 300 extracted from an image obtained by scanning, with the SEM, a cross-section in a X and Z-direction (length and thickness direction) cut from a central portion in a Y-direction (width direction) of the body 110.

In addition, according to an example embodiment of the present disclosure, the island region may have an average diameter of 0.3 to 1 µm. When the average diameter of the island region is less than 0.3 µm, Cu nanoparticles may easily agglomerate at epoxy curing temperature, resulting in an increase in ESR caused by a decrease in contact area. Conversely, when the average diameter of the island region is greater than 1 µm, the curing temperature may need to be increased to secure contact properties.

In this case, as one method for measuring the average diameter of the island region, the average diameter may be measured by scanning, with the SEM, an image of a cross-section of the body 110 in a length and thickness direction (L-T).

For example, as illustrated in FIG. 2, the average diameter may be measured by obtaining an average value of maximum diameters of island regions measured with respect to ten arbitrary island regions extracted from an image obtained by scanning, with the SEM, a cross-section in a X and Z-direction (length and thickness direction) cut from a central portion in a Y-direction (width direction) of the body 110.

In some embodiments, the electrode layer may include a plurality of the island region. Each of the island region may be spaced apart from each other.

In addition, according to an example embodiment of the present disclosure, the electrode layer may have an average thickness of 0.3 to 1 µm. When the average thickness of the electrode layer is less than 0.3 µm, the ESR may be increased at a curing temperature of 400° C. or less. Conversely, when the average thickness of the electrode layer is greater than 1 µm, the curing temperature may need to be increased.

In addition, according to an example embodiment of the present disclosure, the underlying electrode layer may have an average thickness of 2 to 20 µm. When the average thickness of the underlying electrode layer is less than 2 µm, a problem may occur in contact properties with an internal electrode. Conversely, when the average thickness of the underlying electrode layer is greater than 20 µm, an effective volume may be reduced.

A method for measuring the average thickness of the electrode layer and the average thickness of the underlying electrode layer is not particularly limited. However, for example, the average thickness of the electrode layer and the average thickness of the underlying electrode layer may be measured by scanning, with the SEM, an image of a cross-section of the body 110 in a length and thickness direction (L-T).

For example, as illustrated in FIG. 2, the average thickness of the electrode layer may be measured by obtaining an average value of thicknesses of the electrode layer measured at ten arbitrary equally spaced apart points extracted from an image obtained by scanning, with the SEM, a cross-section in a X and Z-direction (length and thickness direction) cut from a central portion in a Y-direction (width direction) of the body 110, or the average thickness of the underlying electrode layer may be measured by obtaining an average value of thicknesses of the underlying electrode layer measured at ten arbitrary equally spaced apart points extracted from an image obtained by scanning, with the SEM, a cross-section in a X and Z-direction (length and thickness direction) cut from a central portion in a Y-direction (width direction) of the body 110.

According to an example embodiment of the present disclosure, the conductive resin layers 133a and 133b may include conductive metal particles, and the conductive metal particles may be tin (Sn). Tin metal particles and resin may be used for the conductive resin layers 133a and 133b, thereby manufacturing a chip resistant to bending stress.

According to an example embodiment of the present disclosure, the conductive resin layers 133a and 133b may be formed by sequentially forming the above-described electrode layers 132a and 132b on the above-described underlying electrode layers 131a and 131b, coating a resin paste including tin as conductive metal particles, and then performing a curing treatment at a temperature of 400° C. or less (or less than 400° C.)

According to an example embodiment of the present disclosure, each of the conductive metal particles included in the conductive resin layer may have an average particle diameter of 0.3 to 1 µm. When the average particle diameter of each of the conductive metal particles is less than 0.3 µm, the metal particles may easily agglomerate, and thus a contact area may be reduced. Conversely, when the average particle diameter of each of the conductive metal particles is greater than 1 µm, high curing temperature may be required.

As one method for measuring the average particle diameter of each of the conductive metal particles included in the conductive resin layer, the average particle diameter of each of the conductive metal particles included in the conductive resin layer may be measured by scanning, with the SEM, an image of a cross-section of the body 110 in a length and thickness direction (L-T).

For example, as illustrated in FIG. 2, the average particle diameter of each of the conductive metal particles included in the conductive resin layer may be measured by obtaining an average value of maximum particle diameters of ten arbitrary conductive metal particles included in the conductive resin layer extracted from an image obtained by scanning, with the SEM, a cross-section in a X and Z-direction (length and thickness direction) cut from a central portion in a Y-direction (width direction) of the body 110.

In addition, according to an example embodiment of the present disclosure, the conductive resin layer may have an average thickness of 2 to 30 µm. When the average thickness of the conductive resin layer is less than 2 µm, a problem may occur in adhesion strength and bending strength. When the average thickness of the conductive resin layer is greater than 30 µm, a chip size may be increased, which may cause a limitation on an effective volume. A method for measuring the average thickness of the conductive resin layer is not particularly limited. However, for example, the average thickness of the conductive resin layer may be measured through the same method as the method for measuring the average thickness of the electrode layer and the average thickness of the underlying electrode layer.

In addition, according to an example embodiment of the present disclosure, copper-tin alloy layers 151a and 151b may be further included between the electrode layers 132a and 132b and the conductive resin layers 133a and 133b. The copper-tin alloy layer 151a and 151b to be described below may be formed by inserting the electrode layers 132a and 132b including copper between the nickel external electrodes 131a and 131b and the conductive resin layers 133a and 133b including tin and resin. The copper-tin alloy layers 151a and 151b may be formed in this manner, thereby improving degradation of moisture-resistance reliability caused by high moisture permeability of the resin.

According to an example embodiment of the present disclosure, the copper-tin alloy layer may have an average thickness of 2 to 30 µm. When the average thickness of the copper-tin alloy layer is less than 2 µm, a problem may occur in adhesion strength and bending strength. When the average thickness of the copper-tin alloy layer is greater than 30 µm, a chip size may be increased, which may cause a limitation on an effective volume.

In this case, a method for measuring the average thickness of the copper-tin alloy layer is not particularly limited. However, for example, the average thickness of the copper-tin alloy layer may be measured through the same method as the above-described method for measuring the average thickness of the conductive resin layer.

A size of the multilayer electronic component 100 does not need to be particularly limited.

However, in order to achieve miniaturization and implementation of high capacitance at the same time, it may be necessary to increase the number of stacks by reducing thicknesses of a dielectric layer and an internal electrode, and thus the multilayer electronic component 100 having a size of 0402 (length×width, 0.4 mm×0.2 mm) or less may have a more significant reliability improvement effect according to the present disclosure.

Accordingly, in consideration of a manufacturing error, an external electrode size, and the like, when the multilayer electronic component 100 has a length of 0.44 mm or less and a width of 0.22 mm or less, the reliability improvement effect according to the present disclosure may be more significant. Here, the length of the multilayer electronic component 100 may refer to a maximum size of the multilayer electronic component 100 in a second direction, and the width of the multilayer electronic component 100 may refer to a maximum size of the multilayer electronic component 100 in a third direction.

While example embodiments have been shown and described above, it will be apparent to those skilled in the art that modifications and variations could be made without departing from the scope of the present invention as defined by the appended claims.

What is claimed is:

1. A multilayer electronic component comprising:
   a body including a plurality of internal electrodes and a dielectric layer interposed between the plurality of internal electrodes; and
   an external electrode including:
   an electrode layer disposed on the body to be connected to the plurality of internal electrodes, and a conductive resin layer disposed on the electrode layer, wherein the electrode layer includes an island region, and wherein the island region has an average diameter of 0.3 to 1 μm.

2. The multilayer electronic component of claim 1, wherein the electrode layer includes copper.

3. The multilayer electronic component of claim 2, wherein a ratio of a length of a region on which the electrode layer is disposed to a total length of a surface of the body on which the external electrode is disposed is 50% or more.

4. The multilayer electronic component of claim 1, wherein the electrode layer directly contacts a surface of the body.

5. The multilayer electronic component of claim 1, wherein the electrode layer has an average thickness of 0.3 to 1 μm.

6. The multilayer electronic component of claim 1, wherein the conductive resin layer includes a conductive metal particle.

7. The multilayer electronic component of claim 6, wherein the conductive metal particle is a tin particle.

8. The multilayer electronic component of claim 6, wherein the conductive metal particle has an average particle diameter of 0.3 to 1 μm.

9. The multilayer electronic component of claim 1, wherein the conductive resin layer has an average thickness of 2 to 30 μm.

10. The multilayer electronic component of claim 1, further comprising:
    a copper-tin alloy layer between the electrode layer and the conductive resin layer.

11. The multilayer electronic component of claim 10, wherein the copper-tin alloy layer has an average thickness of 2 to 30 μm.

12. The multilayer electronic component of claim 1, wherein the electrode layer includes a plurality of the island region, and each of the island region is spaced apart from each other.

13. The multilayer electronic component of claim 3, wherein the ratio is 50% or more and 70% or less.

14. The multilayer electronic component of claim 2, wherein a ratio of a length of a region on which the electrode layer is disposed to a total length of a surface of the body on which the external electrode is disposed is 50% or more and 70% or less.

15. The multilayer electronic component of claim 1, wherein the conductive resin layer includes epoxy.

16. A multilayer electronic component comprising:
    a body including a plurality of internal electrodes and a dielectric layer interposed between the plurality of internal electrodes; and
    an external electrode including:
    an electrode layer disposed on the body to be connected to the plurality of internal electrodes, and
    a conductive resin layer disposed on the electrode layer,
    wherein the electrode layer includes an island region,
    wherein the island region has an average diameter of 0.3 to 1 μm, and
    wherein a ratio of a length of a region on which the electrode layer is disposed to a total length of a surface of the body on which the external electrode is disposed is 50% or more.

17. The multilayer electronic component of claim 16, further comprising:
    an underlying electrode layer between the body and the electrode layer,
    wherein:
    the underlying electrode layer includes nickel,
    the underlying electrode layer has an average thickness of 2 to 20 μm,
    the electrode layer covers the underlying electrode layer,
    the island region covers a portion of a surface of the underlying electrode layer,
    a ratio of a length of a region on which the electrode layer is disposed to a total length of a surface of the underlying electrode layer is 50% or more, and
    the conductive resin layer includes epoxy.

18. The multilayer electronic component of claim 17, wherein:
    the electrode layer includes copper, and the electrode layer has an average thickness of 0.3 to 1 μm.

19. The multilayer electronic component of claim 17, wherein the electrode layer includes a plurality of the island region, and each of the island region is spaced apart from each other.

20. The multilayer electronic component of claim 17, wherein the conductive resin layer includes a conductive metal particle that includes a tin particle, and the conductive metal particle has an average particle diameter of 0.3 to 1 μm.

21. The multilayer electronic component of claim 17, further comprising:
    a copper-tin alloy layer between the electrode layer and the conductive resin layer,
    wherein the copper-tin alloy layer has an average thickness of 2 to 30 μm.

22. A multilayer electronic component comprising:
    a body including a plurality of internal electrodes and a dielectric layer interposed between the plurality of internal electrodes; and
    an external electrode including:
    an electrode layer disposed on the body to be connected to the plurality of internal electrodes,
    an underlying electrode layer between the body and the electrode layer, and
    a conductive resin layer disposed on the electrode layer,
    wherein the electrode layer includes an island region, and wherein a ratio of a length of a region on which the electrode layer is disposed to a total length of a surface of the underlying electrode layer is 50% or more.

* * * * *